United States Patent [19]
Liston

[11] Patent Number: 5,877,894
[45] Date of Patent: Mar. 2, 1999

[54] SYSTEM FOR VIEWING OMNIDIRECTIONALLY PROJECTED IMAGES

[75] Inventor: David B. Liston, 5761 S. Netherland St., Aurora, Colo. 80015

[73] Assignee: David B. Liston, Aurora, Colo.

[21] Appl. No.: 682

[22] Filed: Dec. 30, 1997

[51] Int. Cl.⁶ .................................................. G02C 27/22
[52] U.S. Cl. .......................................... 359/479; 359/443
[58] Field of Search .................................. 359/478, 558, 359/557, 465, 479, 443, 457, 464, 462, 636, 629; 358/231, 88

[56] References Cited

U.S. PATENT DOCUMENTS

| | | | |
|---|---|---|---|
| 4,323,920 | 4/1982 | Collender | 358/88 |
| 4,870,485 | 9/1989 | Downing et al. | 358/90 |
| 4,901,140 | 2/1990 | Lang et al. | 358/64 |
| 4,943,851 | 7/1990 | Lang et al. | 358/87 |
| 4,976,837 | 12/1990 | Lang | 178/791 |
| 5,148,310 | 9/1992 | Batchko | 359/479 |
| 5,155,605 | 10/1992 | Wreede et al. | 359/24 |
| 5,157,546 | 10/1992 | Williams et al. | 359/462 |
| 5,291,330 | 3/1994 | Daniels | 359/478 |
| 5,347,644 | 9/1994 | Sedlmayr | 359/465 |

*Primary Examiner*—Hung Xuan Dang
*Attorney, Agent, or Firm*—Holme Roberts & Owen LLP

[57] ABSTRACT

An omnidirectional viewing system for enabling viewers to view projected images from a plurality of positions about the system. The omnidirectional viewing system includes a plurality of cylindrical sheets of optically transmissive material stacked on one another to form a cylindrical reflection chamber for reconstructing an image projected therein and a reflective coating on the outer surface of the reflection chamber for reflecting at least a first portion of light from at least a first projected image within the reflection chamber and for allowing at least a second portion of light from at least the first projected image to exit the reflection chamber at a plurality of locations on the outer surface of the reflection chamber.

22 Claims, 14 Drawing Sheets

5,877,894

SYSTEM FOR VIEWING OMNIDIRECTIONALLY PROJECTED IMAGES

FIELD OF THE INVENTION

The present invention generally relates to an apparatus for viewing projected images, and, in particular, to an apparatus for viewing projected images from a plurality of positions about the apparatus.

BACKGROUND OF THE INVENTION

Generally, for clarity, an audience viewing projected images (e.g., television images) positions themselves in front of the viewing apparatus (e.g., television screen) displaying the projected images. For example, for optimum viewing, viewers of projected images shown on a standard television screen are typically positioned in front of the television screen, substantially normal to the plane of the television screen. However, in instances where a plurality of viewers wish to watch projected images on such a standard television screen, projected images may appear blurred or distorted to viewers not positioned substantially normal to the television screen.

Over the years, many systems and techniques have been developed to provide for viewing of projected images from many different viewing positions. Generally, such systems attempt to provide 360° viewing of images by rotating a screen having images projected thereon about a vertical axis at high rates of speed. For instance, in one such system, an image is projected onto a screen while the screen itself is rotated at 900 revolutions per minute. However, such systems are relatively complex as many components are needed to mechanically rotate the screen and to project images onto the rotating screen. In another system, a cathode ray tube provides a rotating image, an optical system projects the rotating image to create a real image in space, and a liquid crystal display screen encircles the rotating real image in space and functions as a multi-color filter system. In this system, the image is electronically rotated at 2700 revolutions per minute. This system is similarly very complex as it requires synchronization between the electronically rotating image and the liquid crystal display filter system.

SUMMARY OF THE INVENTION

Accordingly, it is an object of the present invention to provide an omnidirectional viewing system which allows viewers to view projected images from a plurality of positions about the system.

It is another object of the present invention to provide a simple 360° system by which projected images may be viewed by viewers from any angle, relative to the system.

The present invention achieves the above-identified objectives by providing a system which includes a reflection chamber for reconstructing at least a first image (e.g., still image, series of images) within the reflection chamber to provide 360° viewing, at least the first image being projected into the reflection chamber having a plurality of sheets of optically transmissive material stackable on one another, and a reflective coating on the outer wall of the reflection chamber. The reflection chamber also includes a vertically extending slit which allows at least the first projected image to enter the reflection chamber for reconstruction. Such reconstruction is accomplished by reflecting (e.g., radially inwardly, away from the outer wall) at least a first portion of at least the first projected image within the reflection chamber and for allowing at least a second portion of at least the first projected image to exit the reflection chamber. Generally, the reflection of light corresponding to at least the first projected image within the reflection chamber and emergence of light corresponding to at least the first projected image from the reflection chamber at a plurality of points provides viewers with 360° viewing. In a preferred embodiment, the sheets of optically transmissive material are cylindrical in cross-section to provide a cylindrical reflection chamber capable of reflecting light corresponding to at least the first projected image internally, within the reflection chamber.

More specifically, for purposes of providing 360° viewing of at least the first projected image, the reflective coating reflects the majority of light striking it (e.g., the first portions of the first projected image) and allows a very small percentage of light (e.g., the second portion of the first projected image) to pass through the reflective coating. In this regard, the reflective chamber, together with the reflective coating, causes a ray of light (e.g., from at least the first projected image) to reflect off of the outer wall of the reflective chamber many times before becoming too weak to be significant. The first portion of at least the first projected image includes rays of light from different points on at least a first of a plurality of horizontal lines across at least the first projected image, which is reflected within the cylindrical reflection chamber, and the second portion of at least the first projected image includes rays of light from different points on at least the first horizontal line across at least the first projected image, which emerges from the cylindrical reflection chamber at different angles relative to an outer wall of the reflection chamber. In particular, the present invention allows light in at least the second portion corresponding to all points along at least a first horizontal line across at least the first projected image to exit the reflection chamber at each point on the surface (e.g., outer wall) of the cylindrical reflection chamber at exit angles corresponding to tangents of the cylindrical reflection chamber at the exit points. Such reflection of light within the reflection chamber and emergence of light from the reflection chamber at a plurality of exit points on the surface of the cylindrical reflection chamber provides 360° viewing of at least the first horizontal line across at least the first projected image. Such reconstruction of at least the first projected image within the reflection chamber is similarly accomplished for light corresponding to different points in a plurality of horizontal lines across at least the first projected image (e.g., corresponding to the height of the first projected image). In this regard, light corresponding to various points of at least the first projected image which have the same vertical coordinate (e.g., light corresponding to points on a single horizontal line across the image) emerge from points on the outer surface or wall of the reflection chamber which have a corresponding vertical coordinate.

The plurality of sheets of optically transmissive material may be generally disk-shaped to provide a cylindrical reflection chamber. In one embodiment, each of the plurality of disk-shaped cylindrical sheets includes an outer wall extending between top and bottom surfaces and a vertically extending slit positioned on the outer wall of each of the cylindrical sheets. For purposes of allowing at least the first projected image to enter the cylindrical reflection chamber, the slits on the outer walls of the disk-shaped sheets are alignable to form a substantially continuous vertically extending slit.

In another embodiment, each of the plurality of cylindrical sheets are ring or washer-shaped disks. That is, each of the disk sheets of optically transmissive material includes inner and outer walls extending between top and bottom surfaces and a vertically extending slit positioned in one of the inner and outer walls of the washer-shaped sheets to allow at least the first projected image to enter into the washer-shaped sheets. Stacking such washer-shaped sheets on one another defines a cylindrical reflection chamber having a bore therethrough. In a preferred embodiment, a vertically extending slit is positioned in the inner wall of the washer-shaped sheets and reflective coating is additionally applicable to the inner walls of the washer-shaped sheets, except in the area of the vertically extending slit. Such vertically extending slits in the inner walls of the washer-shaped sheets are alignable to allow at least the first projected image to enter the cylindrical reflection chamber. As will be described in more detail hereinbelow, use of such washer-shaped sheets to form the cylindrical reflection chamber provides advantages in limited space environments.

The system of the present invention may further include an optical system for configuring projected image radiation, such as the first projected image, to enter into the reflection chamber through the vertically extending slit. The optical system may generally include a means for focusing at least one of horizontal and vertical components of at least the first projected image at the vertically extending slit in the cylindrical reflection chamber. In one embodiment, where the cylindrical reflection chamber is defined by a plurality of vertically stacked sheets, the optical system includes means for focusing a vertical component of at least the first projected image at the vertically extending slit and a means for focusing a horizontal component of at least the first projected image proximal the vertically extending slit. In this regard, the horizontal focal point falls short of or proximal the entrance (i.e., vertically extending slit) to the cylindrical reflection chamber. For purposes of allowing the horizontal component of at least the first image to pass through the vertically extending slit in the cylindrical reflection chamber, the means for focusing may further include a horizontally convex lens positioned at the horizontal focal point. This horizontally convex lens is configured to focus at least the first image such that only rays of light from the horizontal component of at least the first image traveling perpendicular to a flat surface of this lens are able to pass through the vertically extending slit of the cylindrical reflection chamber. In another embodiment, also for use with a reflection chamber defined by a plurality of disk-shaped sheets, the optical system includes a means for focusing a vertical component of at least the first projected image at the vertically extending slit and a means for focusing a horizontal component of at least the first projected image at the vertically extending slit. In this embodiment, a standard convex lens and a single horizontally convex lens are utilized.

In another embodiment, where the reflection chamber is defined by a plurality of washer-shaped sheets, the optical system is positionable above or below the reflection chamber (e.g., in axial alignment with the reflection chamber), such that at least the first projected image is allowed to enter the cylindrical reflection chamber via the vertically extending slit in the inner wall of the sheets. In this regard, the optical system for focusing at least the first image may be alignable with the bore through the cylindrical reflection chamber. In this embodiment, the optical system for use in association with the washer-shaped sheets includes the above-described means for focusing the vertical and horizontal components of at least the first image. Further, the optical system includes a mirror angled within the bore of the cylindrical reflection chamber to reflect at least the first image, as focused by the means for focusing, into the cylindrical reflection chamber through the vertically extending slit in the inner wall.

In another aspect of the present invention, an optical system having a standard convex lens and a horizontally convex lens may be used independently of or in cooperation with the reflection chamber having washer-shaped sheets described hereinabove to provide 360° viewing of at least a first projected image. In one embodiment, the optical system is positionable upon a turntable-like system for rotating the optical system. In this regard, simply rotating the optical system upon a turntable provides 360° viewing without having to rotate a screen upon which such images are projected. In another embodiment, the optical system is positionable upon a turntable-like device within a bore of a rotatable cylindrical reflection chamber defined by a plurality of washer-shaped sheets of optically transmissive material to provide 360° viewing. In this embodiment, the optical system having a standard convex lens and a horizontally convex lens is rotatable with the cylindrical reflection chamber having first and second reflective coatings on the outer and inner surfaces thereof to provide enhanced 360° viewing, the first reflective coating for reflecting at least a first portion of light from at least the first projected image at least radially inwardly and for allowing at least a second portion of light from at least the first projected image to emerge from the reflection chamber, and the second reflective coating for only reflecting light from at least the first projected image at least radially outwardly.

DETAILED DESCRIPTION OF THE INVENTION

FIGS. 1–14 generally illustrate the various features of the present invention which allow at least a first projected image to be viewed from a plurality of positions by viewers located around the omnidirectional projected image viewing system. As such, the viewing system of the present invention provides 360° viewing of projected images, such as television images.

Figure 1:
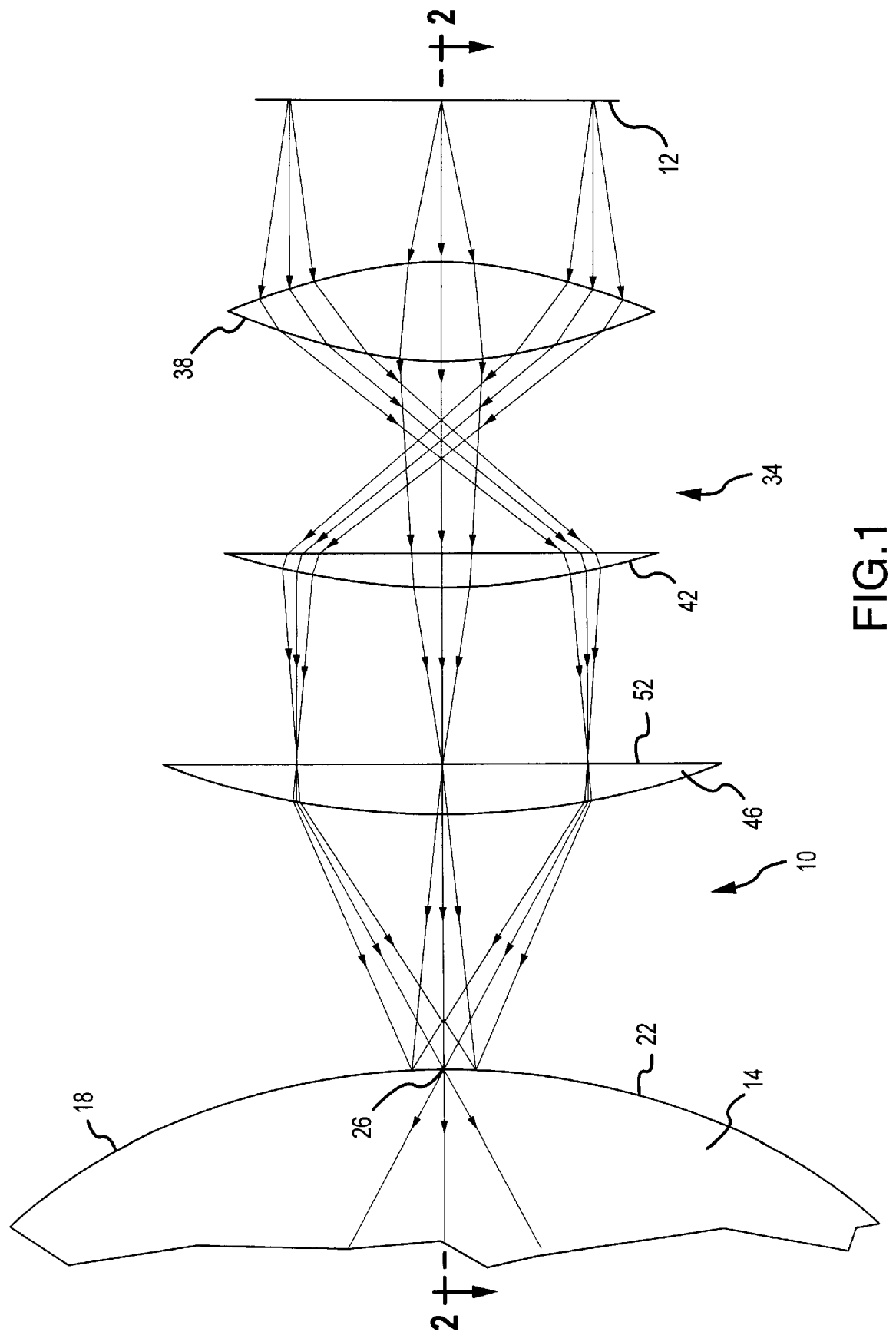
FIG. 1 is a top view of one embodiment of the omnidirectional viewing system of the present invention, and illustrating one embodiment of an optical system.
Figure 2:
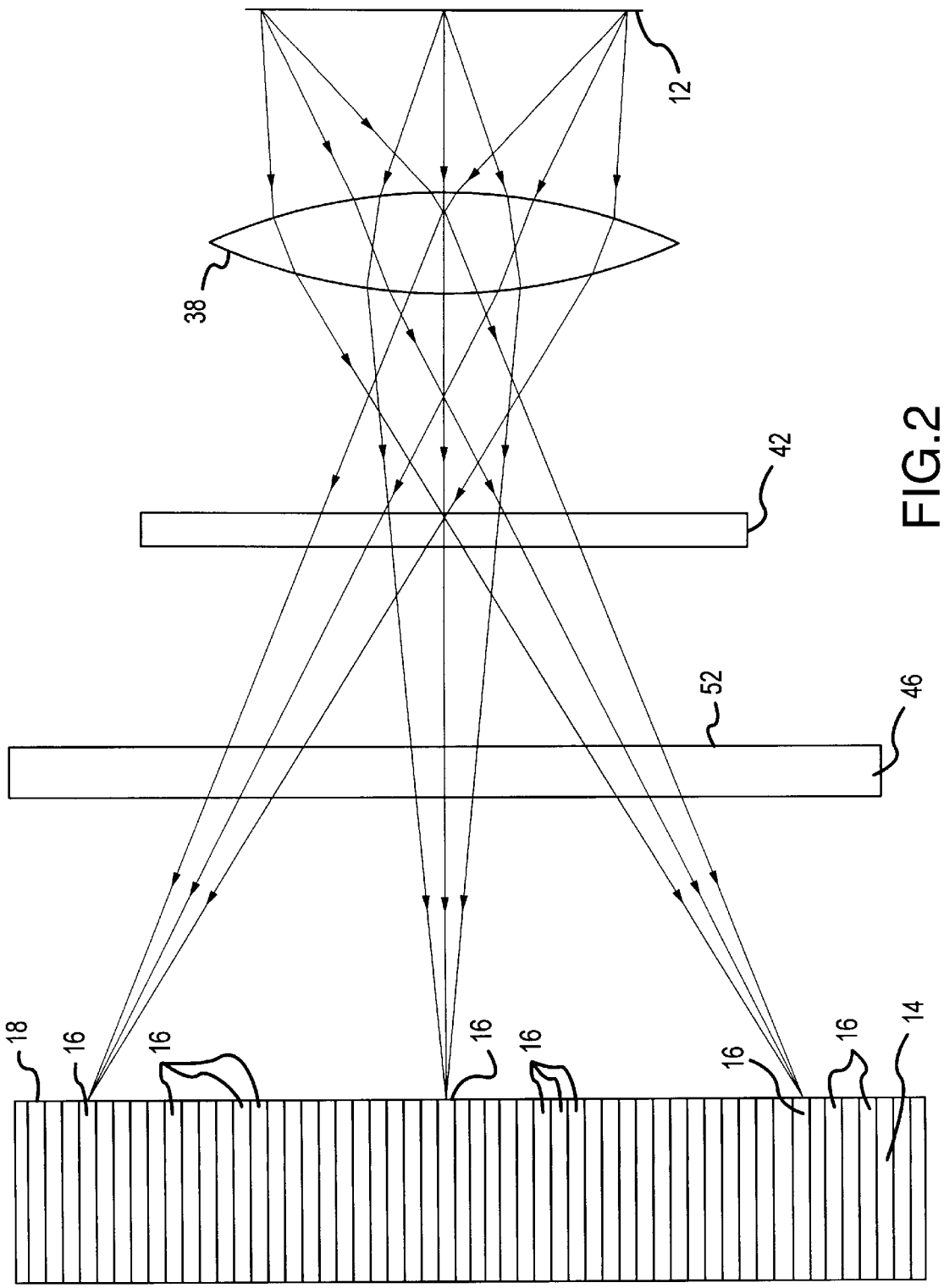
FIG. 2 is a cross-sectional view of the system illustrated in FIG. 1, taken along line 2—2.
Figure 3:
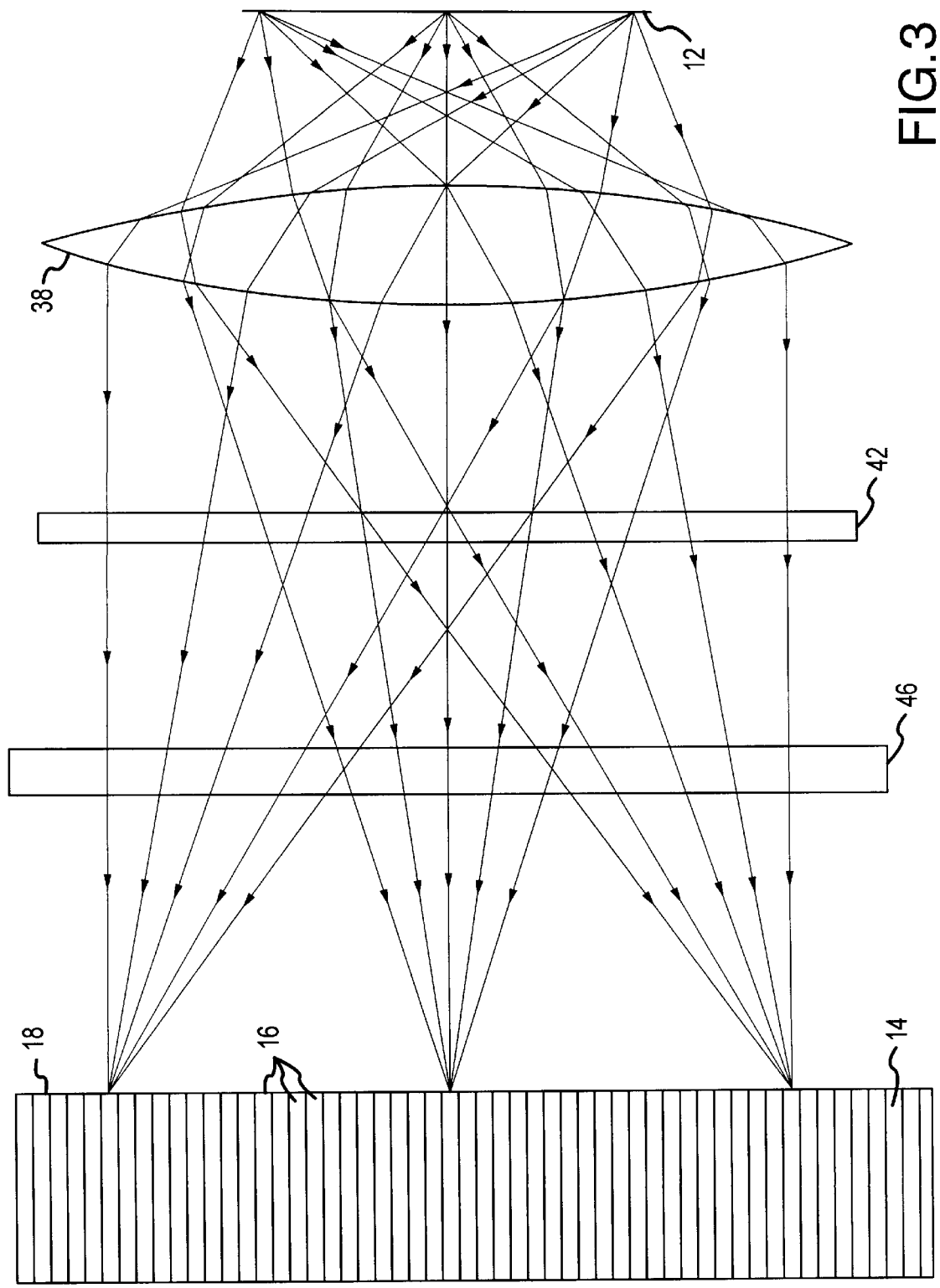
FIG. 3 is a cross-sectional view of the system illustrated in FIG. 1, and illustrating another embodiment of the optical system.
Figure 4:
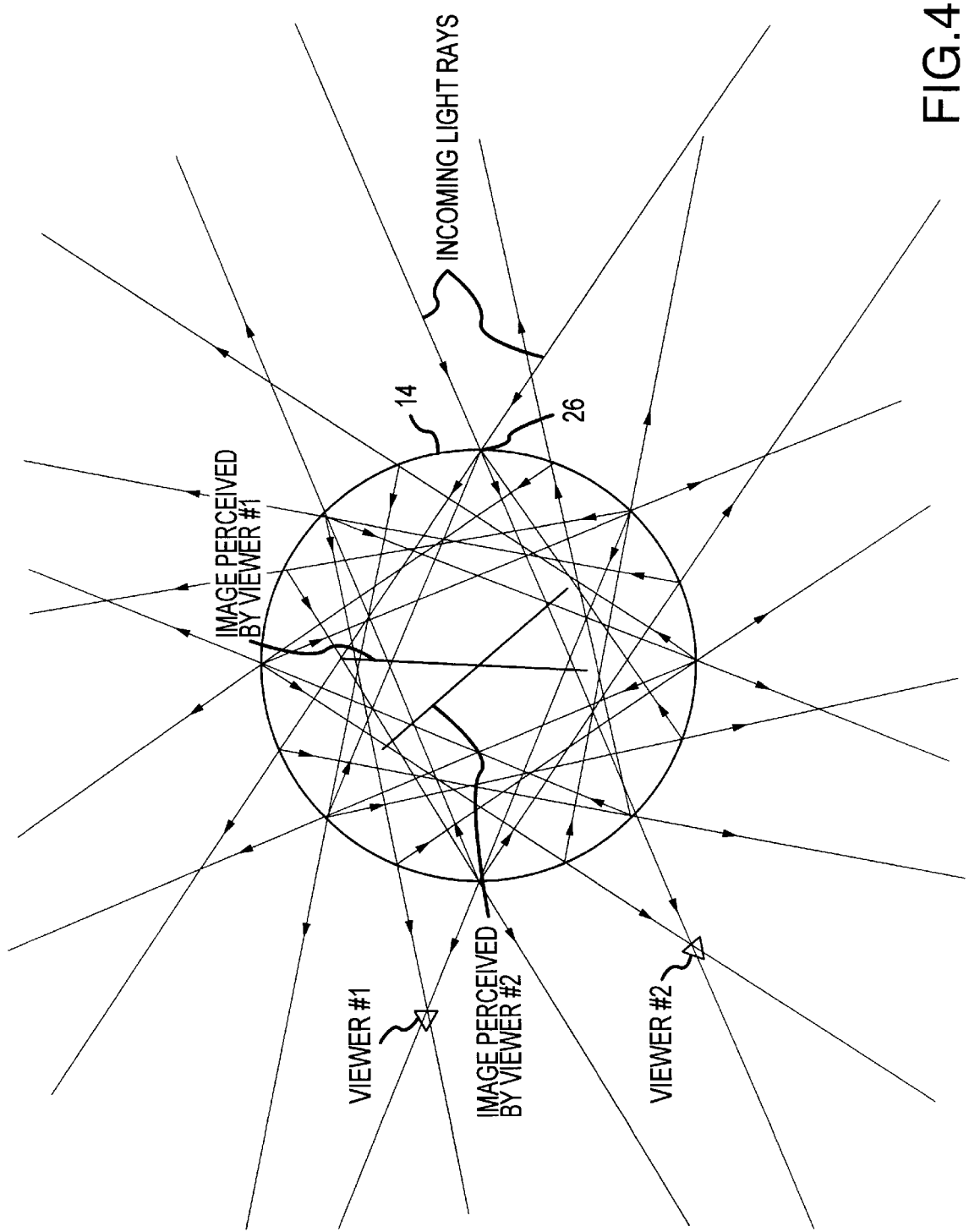
FIG. 4 is a top view of the reflection chamber illustrated in FIG. 1, illustrating the reflection of light rays from the projected image within the reflection chamber and the emergence of light rays from various points around the circumference of the reflection chamber.

In one embodiment, illustrated in FIGS. 1, 2 and 4, the 360° viewing system 10 of the present invention includes a cylindrical reflection chamber 14 for "reconstructing" at least a first projected image 12 and a reflective coating 18 on the outer surface or wall 22 of the reflection chamber 14 for reflecting back into the reflection chamber 14 the majority of light striking the reflective coating 18 and for allowing a very small percentage of at least the first projected image 12 to pass through the reflective coating 18. For purposes of allowing light rays from at least a first projected image 12 to enter the reflection chamber 14, the reflection chamber 14 includes a vertically extending slit 26 on the outer wall 22 of the reflection chamber 14. In this regard, light rays corresponding to the projected image 12 may enter into the reflection chamber 14 via the vertically extending slit 26, which is the only area on the outer surface or wall 22 of the reflection chamber 14 that does not have reflective coating applied thereto.

As illustrated in FIGS. 2 and 4, in one embodiment of the omnidirectional viewing system 10, the reflection chamber 14 includes a plurality of thin sheets 16 of an optically transmissive material. In this embodiment, each of the sheets 16 of optically transmissive material is fabricated from glass and has a circular cross-section so as to form a cylindrical, glass reflection chamber 14 when such sheets 16 are stacked on one another. In this regard, each of the plurality of optically transmissive sheets 16 may be disk-shaped. Further, for purposes of providing a reflection chamber 14 having a vertically extending slit 26, each of the plurality of optically transmissive sheets 16 includes a vertically extending slit, the slits in each of the disk-shaped sheets 16 being alignable relative to one another to provide a continuous vertically extending slit 26 in the cylindrical reflection chamber 14.

For purposes of appropriately configuring at least the first projected image 12 to enter into the reflection chamber 14 via the vertically extending slit 26, the omnidirectional viewing system 10 further includes an optical system 34. In one embodiment, for use with a reflection chamber 14 having a plurality of stacked disk-shaped optically transmissive sheets 16, the optical system 34 may be positioned a distance away from the reflection chamber 14, opposite the vertically extending slit 26. In this embodiment, and as illustrated in FIGS. 1–2, the optical system 34 includes a standard convex lens 38 and two horizontally convex lenses 42, 46 for focusing at least the first projected image 12.

More specifically, a substantially planar projected image 12 (e.g., a first projected image) may first pass through a standard convex lens 38, which functions to converge rays of light in both horizontal and vertical directions. In this regard, the standard convex lens 38 converges the light rays in the vertical direction. Thereafter, light rays corresponding at least to the first projected image 12 pass through a first horizontally convex lens 42, which causes light in the first projected image 12 to bend inward horizontally, but does not affect the vertical component of the light's direction. As illustrated in FIG. 1, the first horizontally convex lens 42 appears "D" shaped when viewed from above. This first horizontally convex lens 42 causes the horizontal focal point of the light rays of the first projected image 12 to fall short or proximal the entrance (i.e., vertically extending slit 26) of the reflection chamber 14 while the vertical focal point of the light rays remain focused at the vertically extending slit 26 of the reflection chamber 14. The optical system 34 further includes, in this embodiment, a second horizontally convex lens 44, which is positionable at the horizontal focal point. This second horizontally convex lens 44 is focused such that only rays of light from the first projected image 12 traveling perpendicular to the flat surface 52 of the second horizontally convex lens 44, which is parallel to the plane tangent to the outer surface or wall 22 of the reflection chamber 14, are able to pass through the narrow, vertically extending slit entrance 26 to the reflection chamber 14. As such, light rays from at least the first projected image 12 which are able to enter the reflection chamber 14 through the vertically extending slit 26 may enter the reflection chamber 14 at an angle, relative to a radial line passing through the vertically extending slit 26, which directly correlates to the light rays' respective horizontal coordinate within the projected image 12, as illustrated in FIGS. 1, 2, 4 and 7. And, since the horizontally convex lenses 42, 46 do not affect the vertical focal point of at least the first projected image 12, light rays from such images pass through the vertically extending slit 26 with vertical coordinates which are directly proportional to the vertical coordinates of the respective points on such images. In an alternative embodiment of the optical system, illustrated in FIG. 3, a standard convex lens 38 having a diameter generally corresponding to the height of the reflection chamber 14 may be used to enhance viewing as the lens allows at least a first light ray corresponding to a point on the first projected image 12 to enter into a sheet 16 of the reflection chamber 14 at an angle substantially perpendicular to the outer surface of the corresponding sheet 16.

Figure 11:
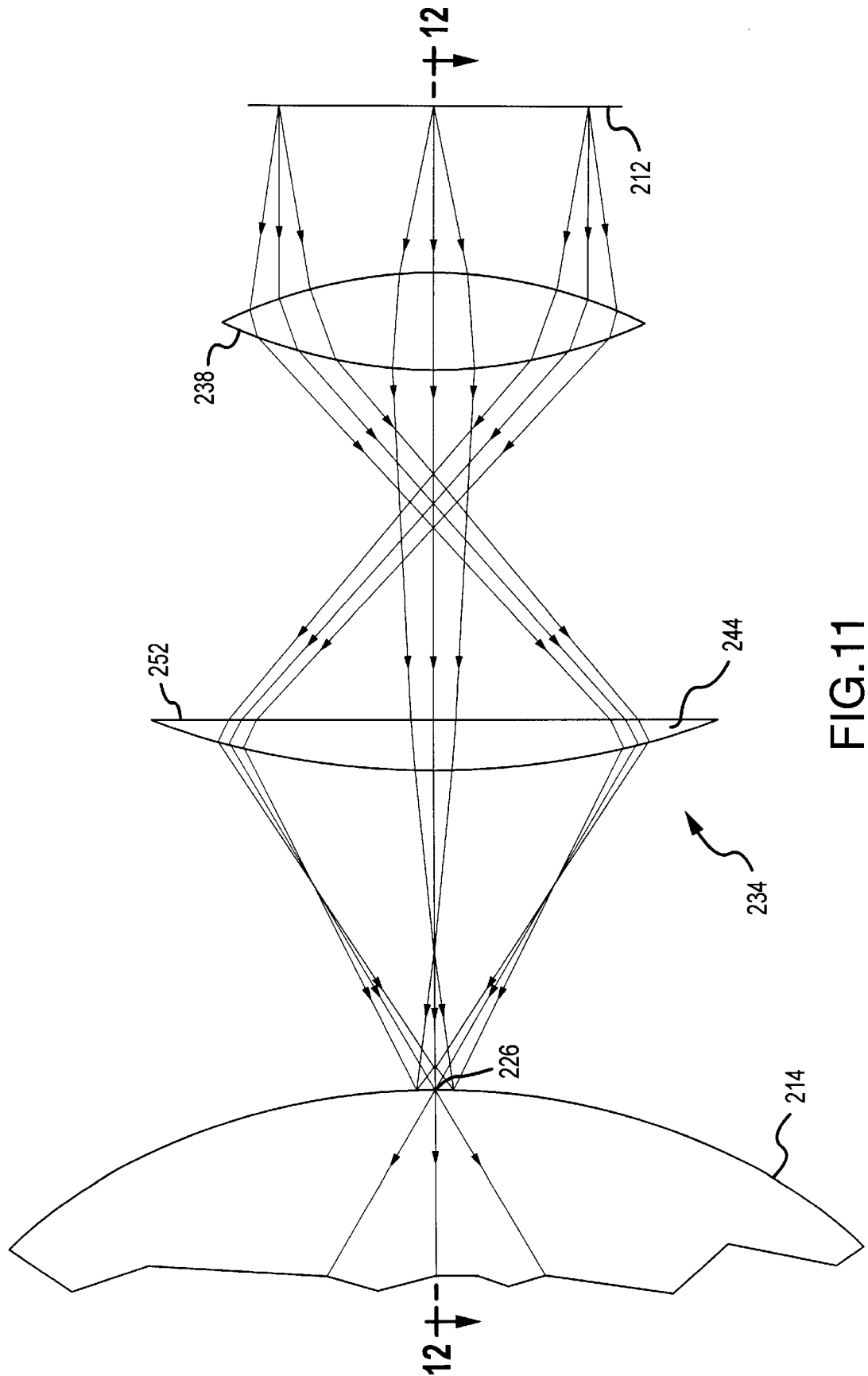
FIG. 11 is a top view of another embodiment of the omnidirectional system of the present invention illustrating a simplified optical system.
Figure 12:
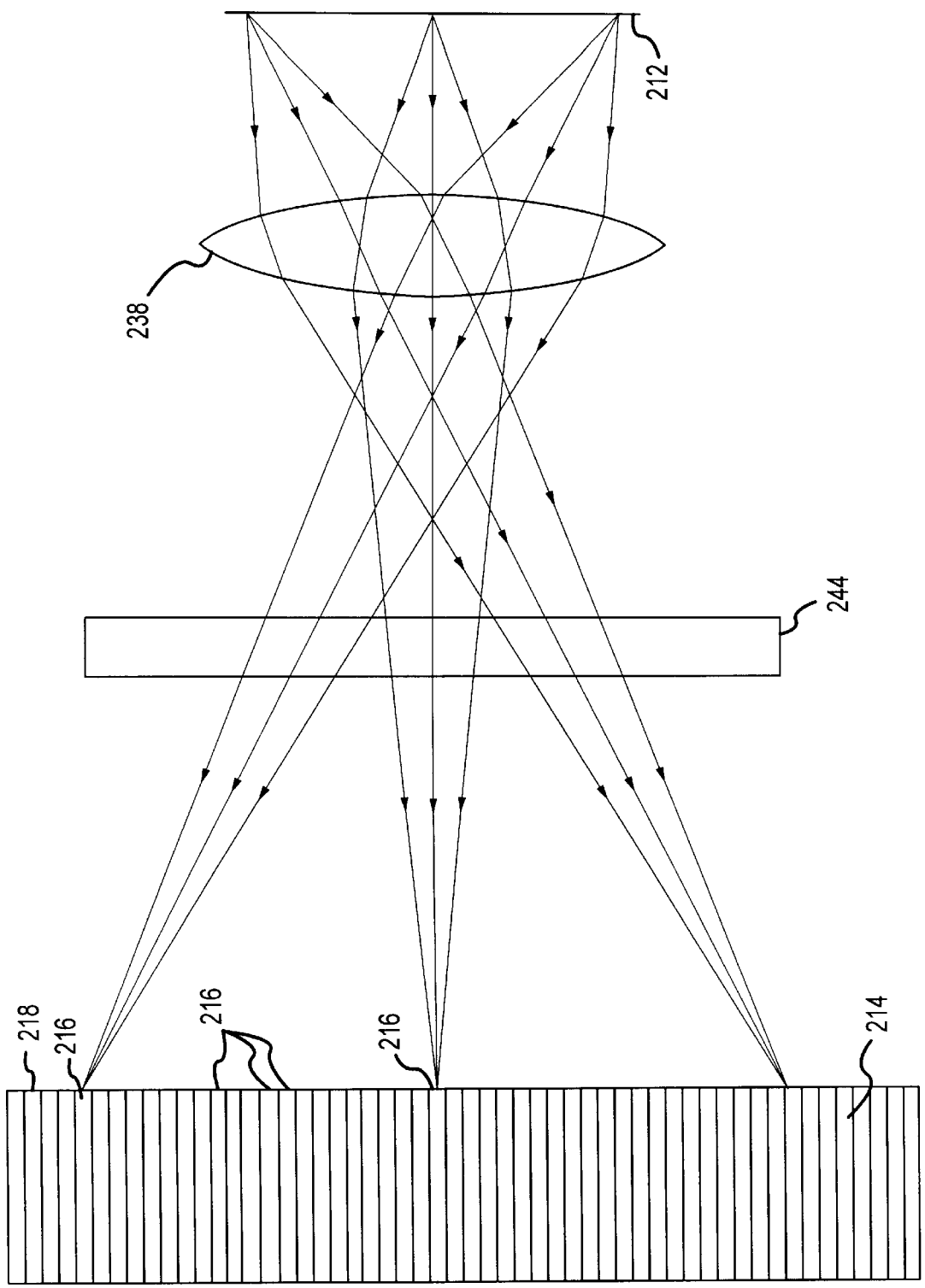
FIG. 12 is a cross-sectional view of the system illustrated in FIG. 11, taken along line 12—12.

In still another alternative embodiment of the optical system, illustrated in FIGS. 11–12, the optical system 234 includes a single horizontally convex lens 244 which is functionally equivalent to the first and second horizontally convex lenses described hereinabove. In this regard, the single horizontally convex lens 244 causes light rays corresponding to at least the first projected image 212 to bend inward horizontally, such that the horizontal focal point of the light rays fall short of the entrance 226 of the reflection chamber 214 while the vertical focal point remains focused at the vertically extending slit of the reflection chamber 214.

Further, the single horizontally convex lens 244 also conveys light rays inward so that the angle of entrance to the reflection chamber 214 corresponds to the vertical coordinate of a point on the image from which the light is originated.

Figure 5:
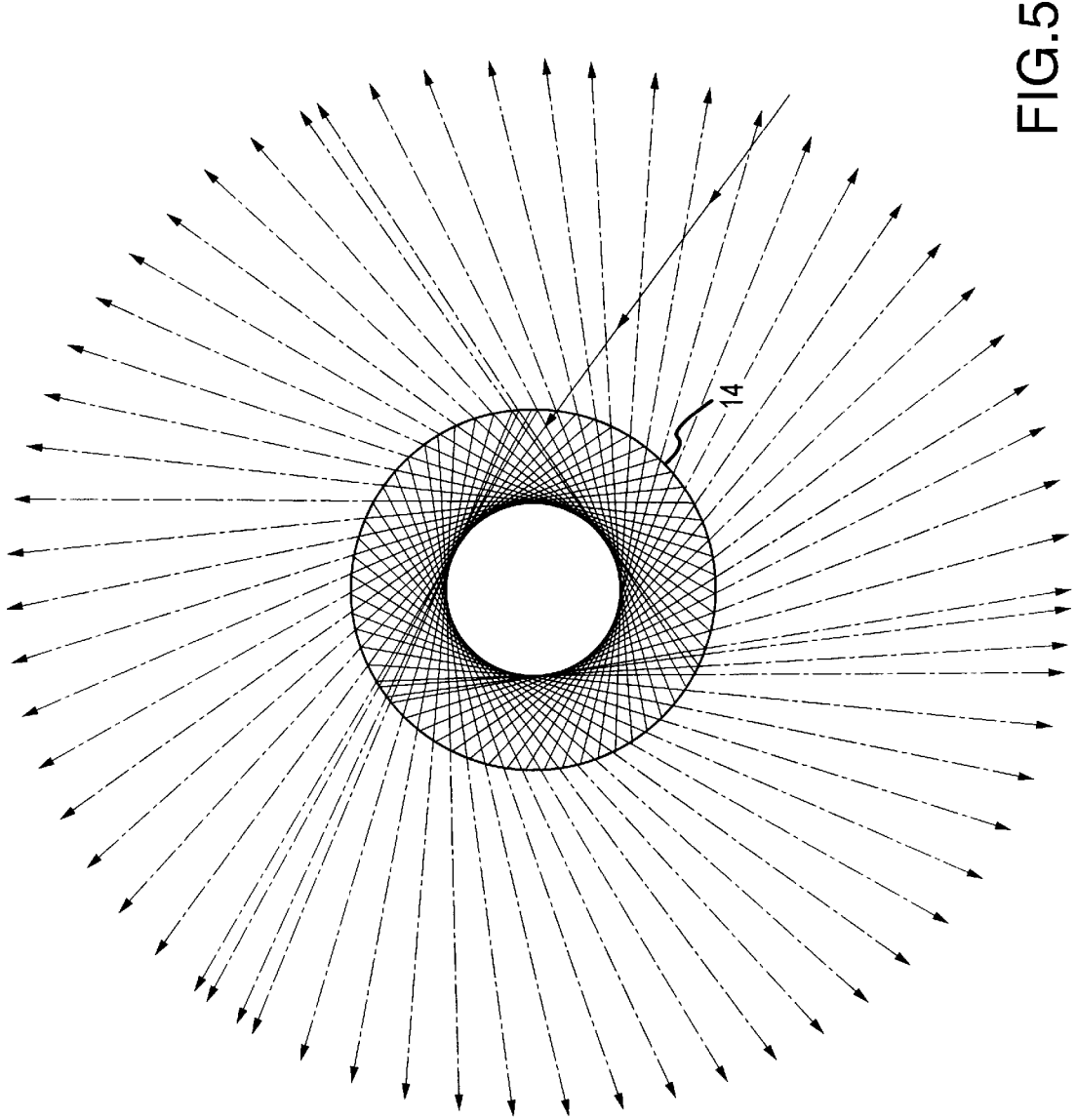
FIG. 5 is a top view of the reflection chamber illustrated in FIG. 1, illustrating the reflection of a single light ray from the projected image within the reflection chamber and the emergence of light rays from various points around the circumference of the reflection chamber.

As illustrated in FIGS. 4–7, light rays are receivable within each of the sheets 16 of the reflection chamber 14. Once within a sheet 16, at least a first portion of a light ray corresponding to an area or point on a horizontal line of at least the first projected image 12 is reflected radially inwardly by the reflective coating 18, and a second portion of the light ray exits the reflection chamber 14, through the reflective coating 18, at a first exit point, at a first exit angle, relative to the outer wall 22 of the reflection chamber 14. In this regard, a small portion of a light ray passes through the reflective coating 18 and exits the reflection chamber 14, at an angle relative to the plane which is tangent to the reflection chamber 14, which corresponds to the horizontal corresponding point on the image from which the light ray originates. Each reflection of the light ray off of the reflective coating 18 on the outer wall 22 is at an angle corresponding to a plane tangent to the reflection chamber 14 at the point of reflection. The horizontal coordinate of the area or point on the first projected image 12 determines the angle of exit or emission from the reflection chamber 14. Such reflection and emergence of light within and from each sheet 16 repeated a plurality of instances as the light ray corresponding to a point of at least the first projected image 12 is reflected within the sheet 16, as shown in FIGS. 4–5. As a result, light corresponding to a specific part or point of at least the first projected image 12 is viewable at a plurality of positions around the reflection chamber 14 (e.g., by viewers #1 and #2). Such internal reflection and emergence of light corresponding to an area or point on a horizontal line of at least the first projected image 12 is similarly accomplished in the sheets 16 of reflection chamber 14 for other areas or points of at least the first projected image 12, the sheets 16 being utilized for such reflection and emergence depending upon the vertical and horizontal coordinates of the points of at least the first projected image 12. As such, the vertical coordinate of the origination point on the image of the light ray determines which sheet 16 in the reflection chamber 14 the ray of light will enter.

Figure 6:
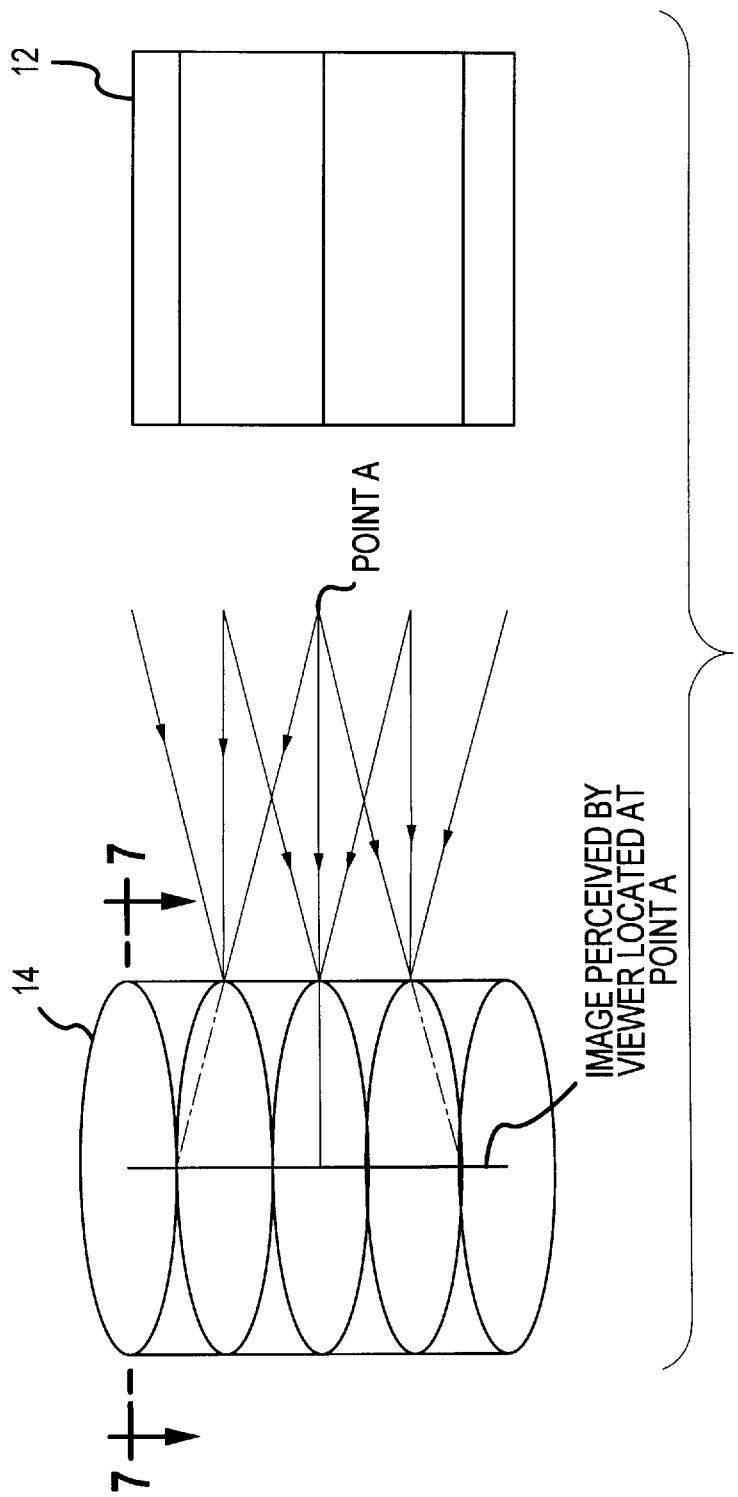
FIG. 6 is a perspective view of the system illustrated in FIG. 1, illustrating the corresponding positioning of vertical components of a projected image within the reflection chamber.
Figure 7:
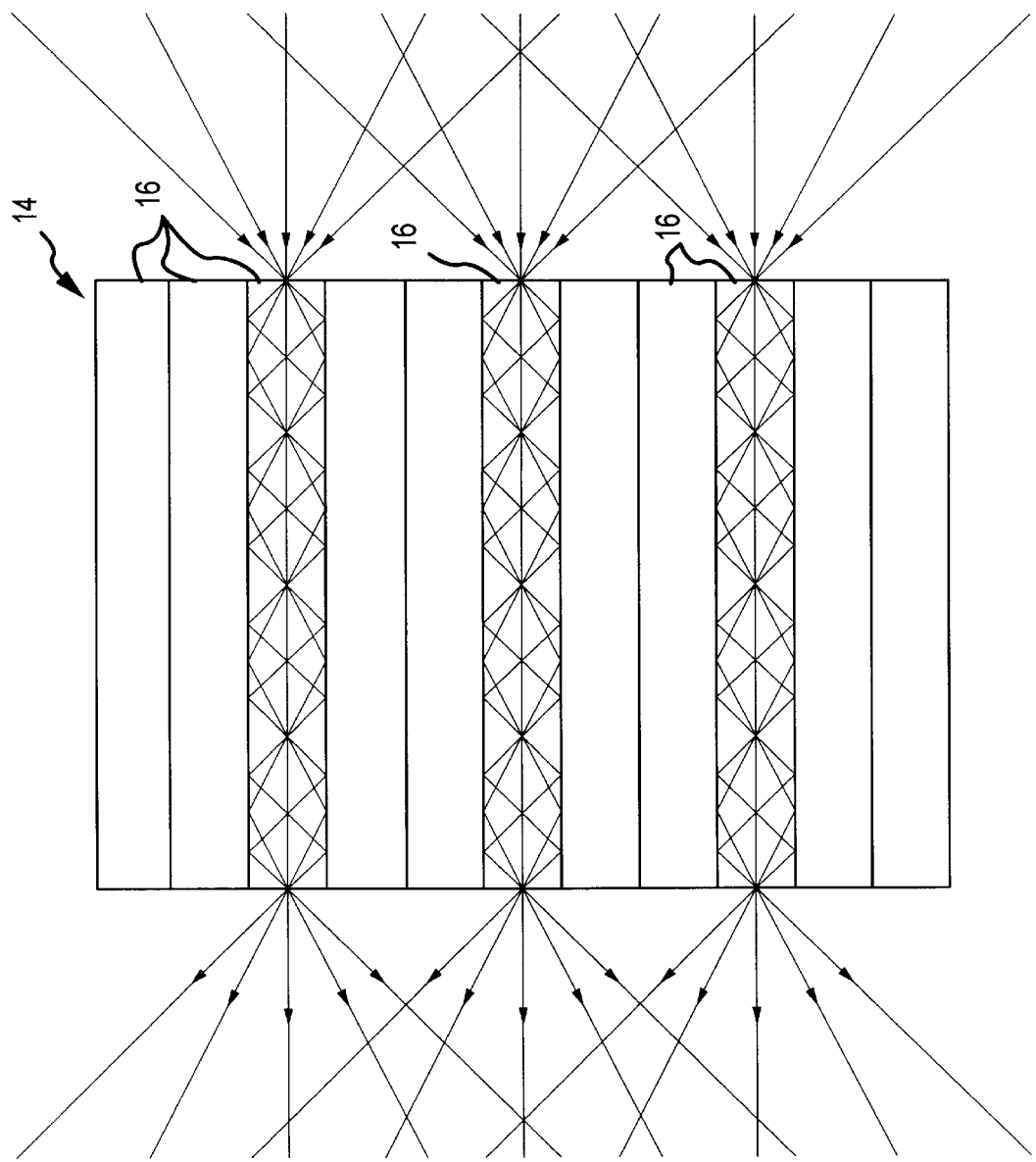
FIG. 7 is a cross-sectional view of the reflection chamber illustrated in FIG. 6 illustrating the path of light rays within the disk shaped sheets.

Further, for purposes of allowing light from a specific vertical coordinate to be trapped within a specific sheet 16 of glass, as illustrated in FIG. 7, each of the sheets 16 is preferably as thin as a pixel. More specifically, due to the phenomenon of total internal reflection, which causes light with an angle of incidence greater than the critical angle to be totally reflected back into the glass sheet, rays of light in one disk or sheet 16 of the reflection chamber 14 are prevented from traveling into neighboring sheets. In this regard, light exits the reflection chamber 14 at the same vertical coordinate as it entered the reflection chamber 14, as illustrated in FIGS. 6–7. In one embodiment, the reflection chamber 14 includes at least 480 sheets 16 of glass stacked on each other. In another embodiment, the reflection chamber 14 includes about 1024 sheets 16 of glass stacked in each other, which provides enhanced resolution.

Figure 8:
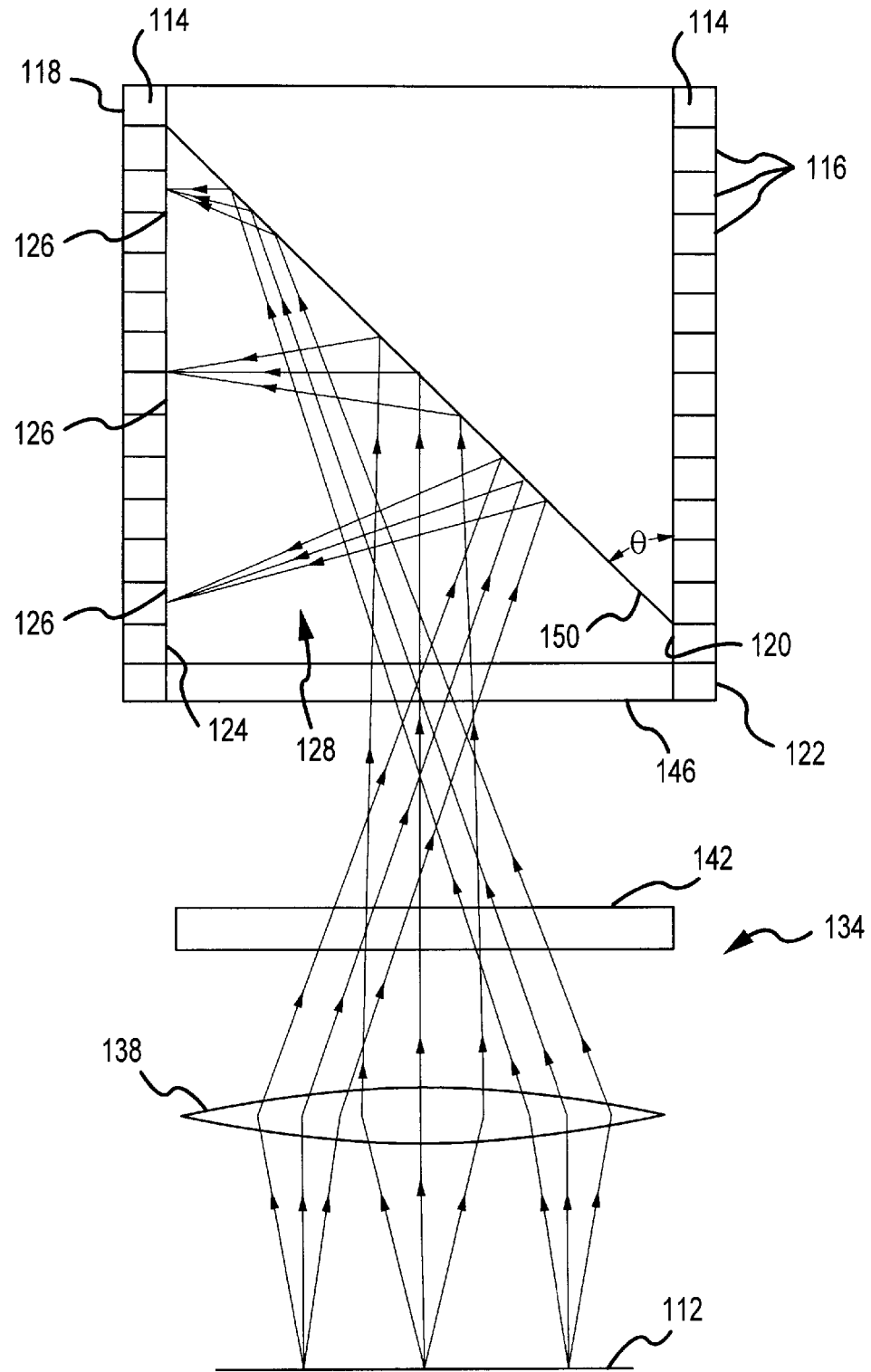
FIG. 8 is a cross-sectional view of another embodiment of the omnidirectional viewing system illustrating a hollow reflection chamber and optical system.
Figure 9:
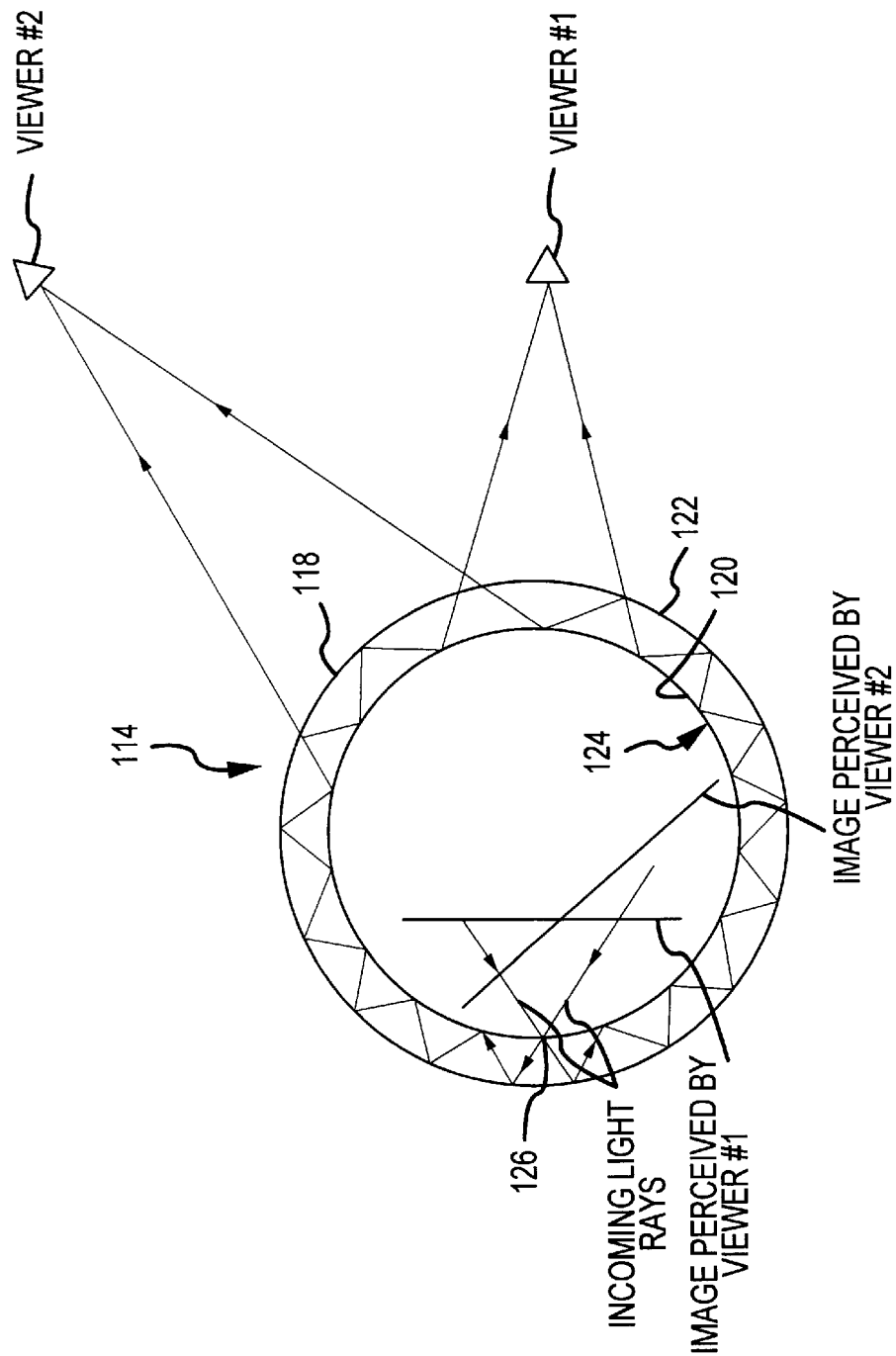
FIG. 9 is a top view of light rays entering the hollow reflection chamber illustrated in FIG. 8 through a vertically extending slit in the inner wall of the hollow reflection chamber, the figure illustrating the reflection of light rays from the projected image within the hollow reflection chamber and the emergence of light rays from various points around the circumference of the hollow reflection chamber
Figure 10:
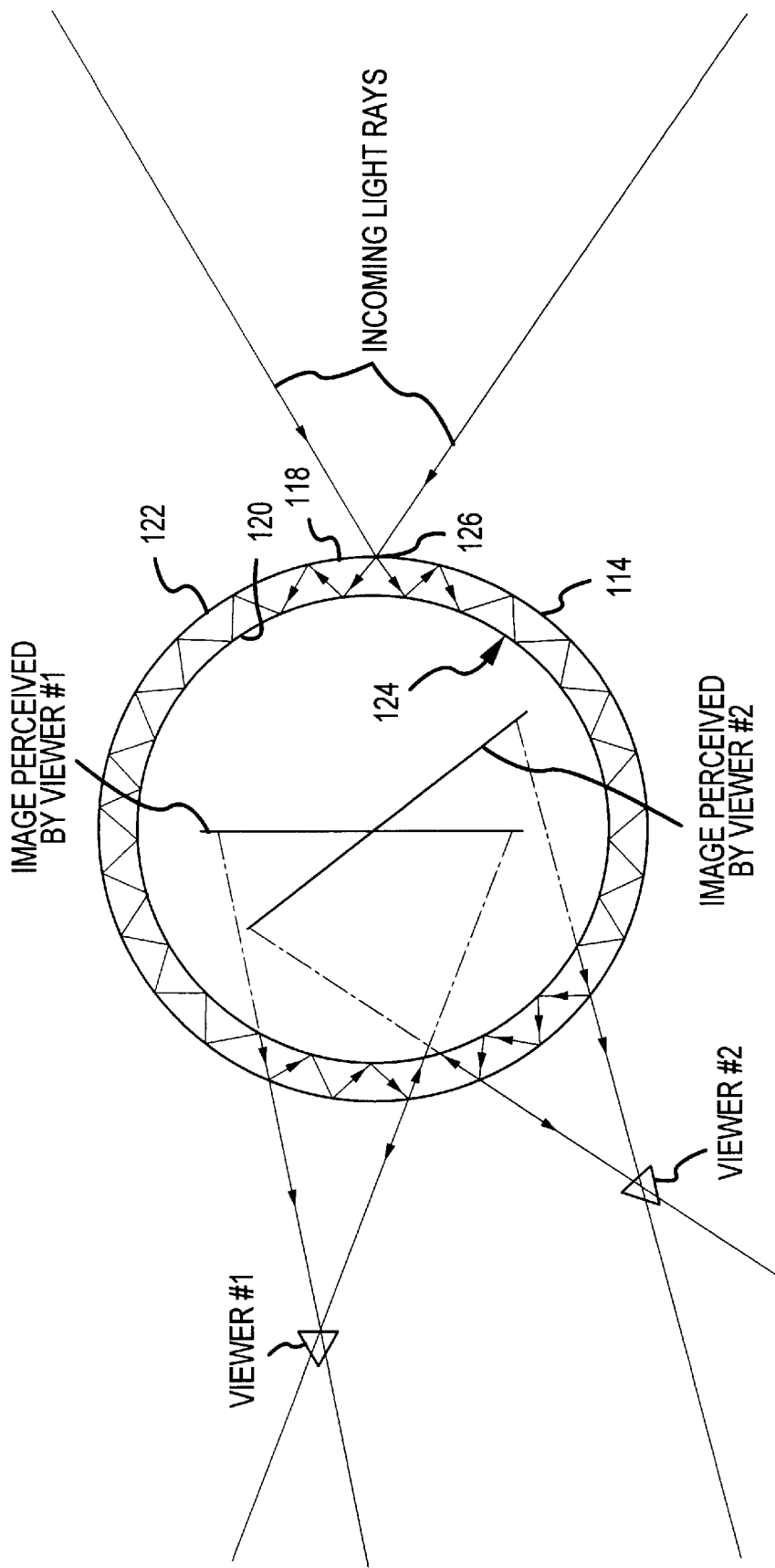
FIG. 10 is a top view of light rays entering the hollow reflection chamber illustrated in FIG. 8 through a vertically extending slit in the outer wall of the hollow reflection chamber, the figure illustrating the reflection of light rays from the projected image within the hollow reflection chamber and the emergence of light rays from various points around the circumference of the hollow reflection chamber

In another embodiment of the omnidirectional viewing system, illustrated in FIGS. 8–9, the reflection chamber 114 is defined by a plurality of "O" or washer-shaped disks 116. In this regard, the reflection chamber 114 includes an axially extending bore 128. As such, light rays corresponding to point of at least a first projected image 112 may enter the reflection chamber 114 through a vertically extending slit 126 in either of the inner wall 124 or the outer wall 122 of the reflection chamber 114, as illustrated in FIGS. 9–10, respectively. In a preferred embodiment, illustrated in FIGS. 8–9, each of the washer-shaped sheets 116 includes a vertically extending slit 126 in the inner wall 124 of each sheet 116, the vertically extending slits being alignable relative to each other. Such placement of the vertically extending slit 126 provides advantages in limited space environments as the optical system 134 for configuring at least the first projected image 112 may be positioned in axial alignment with the bore 128, above or below the reflection chamber 114. FIG. 8 illustrates an optical system 134 positioned below the reflection chamber 114.

As illustrated in FIG. 8, the optical system 134 for use with washer-shaped sheets 116 similarly includes a standard convex lens 138 for converging rays of light in both horizontal and vertical directions and two horizontally convex lenses 142, 146 positionable below the reflection chamber 114. As in the optical system described hereinabove relative to the reflection chamber having a plurality of disk-shaped sheets, the first horizontally convex lens 142 causes light rays of at least the first projected image 112 to bend inward altering the horizontal focal point while the vertical focal point of the light rays of at least the first projected image 112 remains at the vertically extending slit 126 to the reflection chamber 114. However, as described hereinabove, the first horizontally convex lens 142 causes light rays from at least the projected image 112 to bend inward horizontally, causing the horizontal focal point to fall short of the vertically extending slit entrance 126 to the reflection chamber 114. The second horizontally convex lens 146 of the optical system 134 is placed at the horizontal focal point so that only rays of light from at least the first projected image 112 traveling perpendicular to the flat surface 152 of the second horizontally convex lens 146 are able to pass through the vertically extending slit entrance 126 to the reflection chamber 114. Further, a mirror 150 is positionable within the bore 128 of the reflection chamber 114 at an angle G (e.g., 45°) to reflect light rays into the reflection chamber 114 via the vertically extending slit 126.

In this embodiment, illustrated in FIGS. 8–9, a reflective coating 118 is applied to the outer surface 122 of the reflection chamber 114 to reflect the majority of light striking it inwardly (i.e., back into the reflection chamber) while allowing a very small percentage to pass through. In addition, a 100% reflective coating 120 is appliable to the inner wall 124 of the reflective chamber 114 except in the vertically extending slit 126 opening, which allows light rays which form the image to enter the reflection chamber 114.

As in the above-described embodiment utilizing disk-shaped sheets, light from at least the first projected image 112 emerges from the reflection chamber 114 at a plurality of angles of emergence, which are dependent upon the horizontal coordinate of points of at least the first image 112 to which the light rays correspond. As such, a given point on the outer wall or surface 122 of the reflection chamber 114 may be perceived by one viewer as corresponding to one point of at least the first projected image, while another viewer at a different location perceives light coming from the same point as corresponding to a different point on at least the first image, as illustrated in FIG. 9. More specifically, each point on the outer surface or wall 122 of the reflection chamber 114 emits light corresponding to all points along a horizontal line across at least the first image 112. Light from different points on this horizontal line emerge at different angles with respect to the plane tangent to the reflection chamber 114 at the point of emergence.

Such emergence of light from different points on a single horizontal line across the image occur for a plurality of horizontal lines corresponding to all vertical coordinates of the projected image 112 passing through the reflection chamber 114.

The above-described sheets 116 of optically transmissive material may be fabricated from glass or other materials of similar transmissivity. The reflective coating 118 appliable to the outer surface or wall 122 of the reflection chamber 114 is about or more than 99% reflective while the reflective coating 120 appliable to the inner wall 124 of the reflection chamber 114 is 100% reflective.

Figure 13:
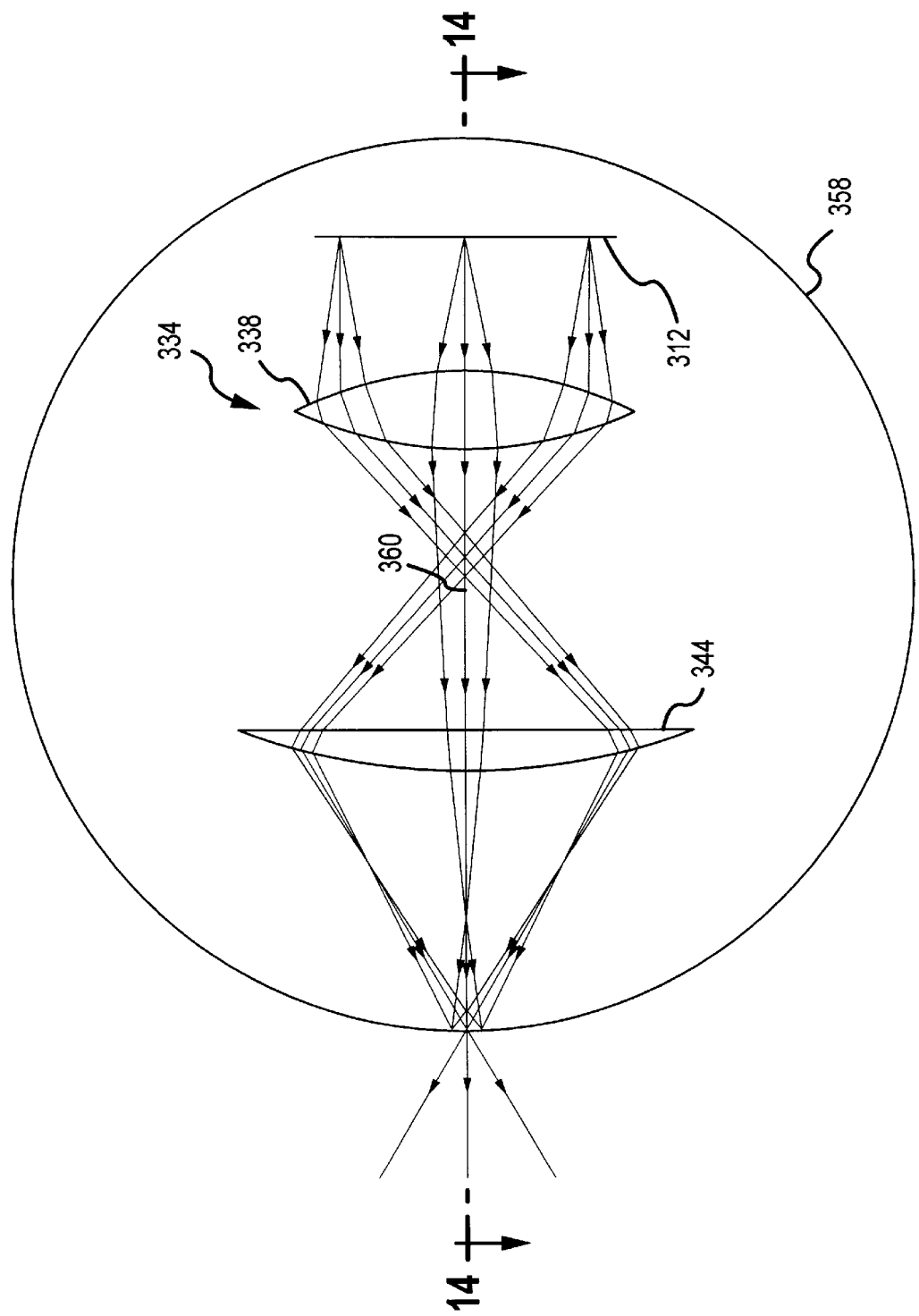
FIG. 13 is a top view of an omnidirectional viewing system.
Figure 14:
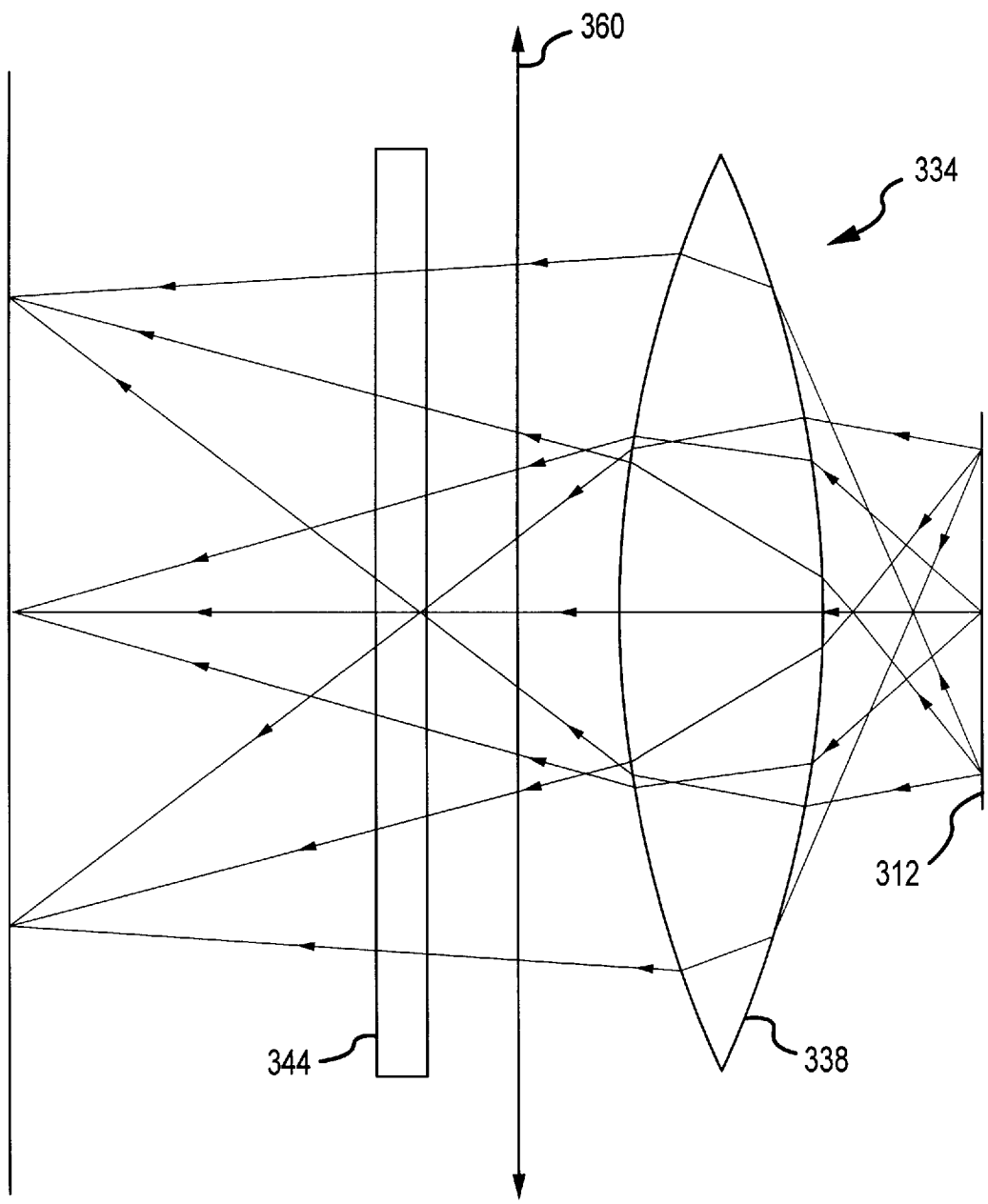
FIG. 14 is a cross-sectional view of the system illustrated in FIG. 13, taken along line 14—14.

In another aspect of the present invention, the optical system described hereinabove relative to FIGS. 11–12 may be utilized in conjunction with a turntable-like device 358 to provide 360° viewing. More specifically, and as illustrated in FIGS. 13–14, a turntable-like device 358 with an optical system 334 having a standard convex lens 338 and a single horizontally convex lens 344 mounted thereon to focus at least a first projected image 312 provides 360° viewing when the lenses mounted on the turntable-like device 358 are rotated at high rates of rotation about the axis of rotation 360. In one embodiment, the optical system 334 produces a critical or single vertical line which is copiable by rotating the critical line at sixty revolutions per second, or 3600 rpm to provide 360° viewing. In another embodiment, enhanced 360° viewing is provided by positioning the optical system 334 illustrated in FIGS. 13–14 within the reflection chamber illustrated in FIGS. 8–9. Rotation of the optical system 334 with the reflection chamber (e.g., simultaneously) enhances viewing clarity as any irregularities caused by the reflection chamber are evened out. In this embodiment, the optical system 334 may be rotated at reduced rates as the reflection chamber effectively spreads out the light from the optical system more evenly.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A 360° viewing system comprising:
    a cylindrical reflection chamber comprising a plurality of cylindrical sheets of optically transmissive material stackable on one another, wherein at least a first of said plurality of cylindrical sheets includes a vertically extending slit for allowing at least a first projected image to enter said cylindrical reflection chamber; and
    means, on an outer wall of said cylindrical reflection chamber, for reflecting radially inwardly at least a first portion of said at least first projected image and for allowing at least a second portion of said at least first projected image to exit said cylindrical reflection chamber.

2. A system, as claimed in claim 1, wherein said optically transmissive material comprises glass.

3. A system, as claimed in claim 1, further comprising:
    an optical system for focusing at least a portion of said at least first projected image, said at least first projected image being projected toward said cylindrical reflection chamber via said optical system.

4. A system, as claimed in claim 3, wherein said optical system focuses at least a vertical component of said at least first projected image at said vertically extending slit.

5. A system, as claimed in claim 3, wherein said optical system is positionable proximal said vertically extending slit and comprises a means for focusing a vertical component of said at least first projected image at said vertically extending slit and for focusing a horizontal component of said at least first projected image proximal said vertically extending slit.

6. A system, as claimed in claim 5, wherein said means for focusing said horizontal component comprises first and second horizontally convex lens positionable proximal said cylindrical reflection chamber.

7. A system, as claimed in claim 1, further comprising:
    a means for generating said at least first projected image, said at least first projected image being two dimensional.

8. A system, as claimed in claim 1, wherein at least said second portion of said at least first projected image exiting said cylindrical reflection chamber includes at least a first plurality of points of light aligned horizontally across said at least first projected image, wherein said first plurality of points of light in said second portion of said at least first projected image exit said cylindrical reflection chamber at a plurality of exit points along said outer wall.

9. A system, as claimed in claim 8, wherein said first plurality of points of light in said second portion of said at least first projected image exiting said cylindrical reflection chamber at said plurality of exit points are oriented at a corresponding plurality of exit angles, relative to tangents to said cylindrical reflection chamber at said exit points.

10. A 360° viewing system comprising:
    a cylindrical reflection chamber comprising a plurality of cylindrical sheets comprising an optically transmissive material stackable on one another, wherein at least a first of said plurality of cylindrical sheets includes an inner wall defining a bore in said cylindrical reflection chamber and a vertically extending slit for allowing at least a first projected image to enter said cylindrical reflection chamber; and
    means, on an outer wall of said cylindrical reflection chamber, for reflecting radially inwardly at least a first portion of said at least first projected image and for allowing at least a second portion of said at least first projected image to exit said cylindrical reflection chamber.

11. A system, as claimed in claim 10, wherein said vertically extending slit is positionable in said inner wall of said at least first of said plurality of cylindrical sheets.

12. A system, as claimed in claim 10, wherein said optically transmissive material is glass.

13. A system, as claimed in claim 10, further comprising:
    means for generating said at least first projected image, wherein said means for generating is vertically alignable with said bore in said cylindrical reflection chamber to project said at least first projected image into said bore.

14. A system, as claimed in claim 10, further comprising:
    an optical system, positional in axial alignment with said bore in said cylindrical reflection chamber, for focusing at least a portion of said at least first image at said vertically extending slit.

15. A system, as claimed in claim 10, further comprising:

an optical system, positionable in axial alignment with said bore in said cylindrical reflection chamber, said optical system comprising a means for focusing a vertical component of said at least first projected image at said vertically extending slit and for focusing a horizontal component of said at least first projected image proximal said vertically extending slit, within said bore.

16. A system, as claimed in claim 15, wherein said means for focusing said horizontal component comprises at least first and second horizontally convex lens.

17. A system, as claimed in claim 10, further comprising:

a mirror, positionable within said bore at a first angle, for reflecting said at least first projected image into said vertically extending slit.

18. A system, as claimed in claim 17, wherein said first angle is approximately 45°, relative to said inner wall defining said bore in said cylindrical reflection chamber.

19. A system, as claimed in claim 10, further comprising:

means, on said inner wall defining said bore, for reflecting radially outwardly, relative to said bore, at least a first portion of said at least first image.

20. A system, as claimed in claim 19, wherein said first portion includes 100% of said at least first projected image.

21. A system, as claimed in claim 10, wherein at least said second portion of said at least first projected image exiting said cylindrical reflection chamber includes at least a first plurality of points of light aligned horizontally across said at least first image, wherein said first plurality of points of light in said second portion of said at least first projected image exit said cylindrical reflection chamber at a plurality of exit points along said outer wall.

22. A system, as claimed in claim 21, wherein said first plurality of points of light in said second portion of said at least first projected image exiting said cylindrical reflection chamber at said plurality of exit points are oriented at a corresponding plurality of exit angles, relative to tangents to said cylindrical reflection chamber at said exit points.

\* \* \* \* \*